US012755311B2

(12) United States Patent
Ueda

(10) Patent No.: US 12,755,311 B2
(45) Date of Patent: Oct. 6, 2026

(54) FOOD RECOMMENDATION SYSTEM, FOOD RECOMMENDATION METHOD, AND PROGRAM

(71) Applicant: Panasonic Intellectual Property Management Co., Ltd., Osaka (JP)

(72) Inventor: Isao Ueda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 36 days.

(21) Appl. No.: 18/865,599

(22) PCT Filed: Mar. 14, 2024

(86) PCT No.: PCT/JP2024/010119

§ 371 (c)(1),
(2) Date: Nov. 13, 2024

(87) PCT Pub. No.: WO2024/203412

PCT Pub. Date: Oct. 3, 2024

(65) Prior Publication Data

US 2026/0127654 A1 May 7, 2026

(30) Foreign Application Priority Data

Mar. 28, 2023 (JP) ................................ 2023-051611

(51) Int. Cl.
*G06Q 30/00* (2023.01)
*G06Q 30/0601* (2023.01)
*G06Q 50/12* (2012.01)

(52) U.S. Cl.
CPC ....... *G06Q 30/06311* (2025.08); *G06Q 50/12* (2013.01)

(58) Field of Classification Search
CPC .................................................. G06Q 30/0631
See application file for complete search history.

(56) References Cited

U.S. PATENT DOCUMENTS 11,830,603 B1 * 11/2023 Lee ........................ G16H 40/63
2018/0322864 A1 * 11/2018 Sakamoto .......... G06Q 30/0282
(Continued)

FOREIGN PATENT DOCUMENTS

JP 2022-124701 A 8/2022

OTHER PUBLICATIONS

Abdool, Hannah, Akash Pooransingh, and Ying Li. "Recommend My Dish: A multi-sensory food recommender." 2015 IEEE Pacific Rim conference on communications, computers and signal processing (PACRIM). IEEE, 2015.*
(Continued)

*Primary Examiner* — Kathleen Palavecino
(74) *Attorney, Agent, or Firm* — Rimon P.C.

(57) ABSTRACT

This food recommendation system includes: an acquisition unit that acquires in advance event data including identification information of a food eaten by a user, food type information including taste sensation information for classifying the food by taste sensation, and mealtime information; an extraction unit that calculates, by a time-series association analysis, a characteristic index including at least one of a support degree, a reliability degree, and a lift value related to the dietary habit of the user on the basis of the event data, and extracts a specific characteristic index corresponding to specific food type information input by the user; and a recommendation unit that outputs a food candidate that is proposed to the user on the basis of the specific characteristic index.

9 Claims, 12 Drawing Sheets

(56) References Cited

U.S. PATENT DOCUMENTS

| | | | | |
|---|---|---|---|---|
| 2019/0295440 | A1* | 9/2019 | Hadad | G06N 3/0464 |
| 2020/0303055 | A1* | 9/2020 | Leifer | G06N 20/10 |
| 2021/0004891 | A1* | 1/2021 | Abutair | G06N 5/04 |
| 2023/0008912 | A1* | 1/2023 | Aso | G06Q 50/12 |
| 2024/0087718 | A1* | 3/2024 | Kim | G16H 40/67 |

OTHER PUBLICATIONS

International Search Report dated May 21, 2024 issued in International Patent Application No. PCT/JP2024/010119, with English translation.

* cited by examiner

| DISH NAME (IDENTIFICATION INFORMATION) | CHICKEN STEW 1 | CHICKEN STEW 2 | CHICKEN STEW 3 | CHICKEN STEW 4 | CHICKEN STEW 5 |
|---|---|---|---|---|---|
| INGREDIENT INFORMATION | JAPANESE YAM | KONNYAKU | LOTUS ROOT | RADISH | RADISH |
| TASTE SENSATION INFORMATION (DISH TYPE INFORMATION) | SOFT AND CHEWY | FIRM AND JUICY | CRUNCHY | REFRESHING | SYRUPY |

FIG. 5

15

| MEAL TIME INFORMATION | | 4/1 | 4/2 | ... | 4/x | ... |
|---|---|---|---|---|---|---|
| DISH NAME (IDENTIFICATION INFORMATION) | | CHICKEN STEW | MEAT AND POTATO STEW | ... | CURRY | ... |
| TASTE SENSATION (DISH TYPE) INFORMATION) | | REFRESHING | FIRM AND JUICY | ... | RICH AND THICK | ... |
| INGREDIENT INFORMATION | INGREDIENT 1 | CHICKEN | BEEF | ... | BEEF | ... |
| | INGREDIENT 2 | ONION | POTATO | ... | CARROT | ... |
| | INGREDIENT 3 | KONNYAKU | ONION | ... | ONION | ... |
| | INGREDIENT 4 | LOTUS ROOT | RADISH | ... | CHEESE | ... |
| | ⋮ | ⋮ | ⋮ | ⋮ | ⋮ | ⋮ |

15a 15b 15x

FIG. 6

16 15z2 15z1

| EVENT A BEFORE REFERENCE DAY | | | EVENT B ON REFERENCE DAY | | | CHARACTERISTIC INDEX | | |
|---|---|---|---|---|---|---|---|---|
| TASTE SENSATION (DISH TYPE) INFORMATION | INGREDIENT INFORMATION | DISH NAME (IDENTIFICATION INFORMATION) | TASTE SENSATION (DISH TYPE) INFORMATION | INGREDIENT INFORMATION | DISH NAME (IDENTIFICATION INFORMATION) | SUPPORT LEVEL | CONFIDENCE LEVEL | LIFT VALUE |
| STIFF | CARROT | ONE DAY BEFORE HAMBURG STEAK | PLUMP AND JUICY | ONION | MEAT AND POTATO STEW | 0. 4 | 0. 7 | 2. 8 |
| STIFF | ONION | ONE DAY BEFORE HAMBURG STEAK | PLUMP AND JUICY | CARROT | MEAT AND POTATO STEW | 0. 4 | 0. 6 | 2. 8 |
| STIFF | CARROT | ONE DAY BEFORE HAMBURG STEAK | PLUMP AND JUICY | KONNYAKU | MEAT AND POTATO STEW | 0. 1 | 0. 2 | 1. 5 |
| ⋮ | ⋮ | ⋮ | ⋮ | ⋮ | ⋮ | ⋮ | ⋮ | ⋮ |
| STIFF | CARROT | 2 DAYS BEFORE HAMBURG STEAK | PLUMP AND JUICY | LETTUCE | CHICKEN STEW | 0. 4 | 0. 7 | 2. 8 |
| ⋮ | ⋮ | ⋮ | ⋮ | ⋮ | ⋮ | ⋮ | ⋮ | ⋮ |

FIG. 7

16a 17 15z1 15z2

| VARIABLE | | | EVENT A BEFORE REFERENCE DAY | | | EVENT B ON REFERENCE DAY | | |
|---|---|---|---|---|---|---|---|---|
| VARIABLE NAME | VARIABLE VALUE | CHARACTERISTIC INDEX | TASTE SENSATION (DISH TYPE) INFORMATION) | INGREDIENT INFORMATION | DISH NAME (IDENTIFICATION INFORMATION) | TASTE SENSATION (DISH TYPE) INFORMATION) | INGREDIENT INFORMATION | DISH NAME (IDENTIFICATION INFORMATION) |
| X1 | 0. 6 | SUPPORT LEVEL | PLUMP AND JUICY | ONION | MEAT AND POTATO STEW | REFRESHING | CHICKEN | CHICKEN STEW |
| X2 | 0. 5 | SUPPORT LEVEL | PLUMP AND JUICY | ONION | MEAT AND POTATO STEW | REFRESHING | BEAN SPROUTS | CHICKEN STEW |
| X3 | 0. 4 | SUPPORT LEVEL | PLUMP AND JUICY | CARROT | MEAT AND POTATO STEW | REFRESHING | CHICKEN | CHICKEN STEW |
| ⋮ | ⋮ | ⋮ | ⋮ | ⋮ | ⋮ | ⋮ | ⋮ | ⋮ |
| Y1 | 0. 8 | CONFIDENCE LEVEL | PLUMP AND JUICY | ONION | MEAT AND POTATO STEW | REFRESHING | CHICKEN | CHICKEN STEW |
| ⋮ | ⋮ | ⋮ | ⋮ | ⋮ | ⋮ | ⋮ | ⋮ | ⋮ |
| Z1 | 0. 7 | LIFT VALUE | PLUMP AND JUICY | ONION | MEAT AND POTATO STEW | REFRESHING | CHICKEN | CHICKEN STEW |
| ⋮ | ⋮ | ⋮ | ⋮ | ⋮ | ⋮ | ⋮ | ⋮ | ⋮ |

29

FIG. 8

22 23 24a

| USER NAME | VARIABLE | | | | | | | | SIMILARITY |
|---|---|---|---|---|---|---|---|---|---|
| | X1 | X2 | X3 | ··· | Y1 | ··· | Z1 | ··· | |
| USER P | 0. 6 | 0. 5 | 0. 4 | ··· | 0. 8 | ··· | 0. 7 | ··· | 1. 00 |
| OTHER USER P1 | 0. 4 | 0. 5 | 0. 6 | ··· | 0. 8 | ··· | 0. 7 | ··· | 0. 80 |
| OTHER USER P2 | 0. 5 | 0. 5 | 0. 4 | ··· | 0. 8 | ··· | 0. 7 | ··· | 0. 90 |
| OTHER USER P3 | 0. 1 | 0. 4 | 0. 1 | ··· | 0. 5 | ··· | 0. 8 | ··· | 0. 50 |
| OTHER USER P4 | 0. 2 | 0. 1 | 0. 1 | ··· | 0. 2 | ··· | 0. 1 | ··· | 0. 20 |
| OTHER USER P5 | 0. 7 | 0. 8 | 0. 8 | ··· | 0. 3 | ··· | 0. 2 | ··· | 0. 30 |
| ⋮ | ⋮ | ⋮ | ⋮ | ⋮ | ⋮ | ⋮ | ⋮ | ⋮ | ⋮ |

24

FIG. 10

FOOD RECOMMENDATION SYSTEM, FOOD RECOMMENDATION METHOD, AND PROGRAM

CROSS-REFERENCE OF RELATED APPLICATIONS

This application is the U.S. National Phase under 35 U.S.C. § 371 of International Patent Application No. PCT/JP2024/010119, filed on Mar. 14, 2024, which in turn claims the benefit of Japanese Patent Application No. 2023-051611, filed on Mar. 28, 2023, the entire disclosures of which Applications are incorporated by reference herein.

TECHNICAL FIELD

The present disclosure relates to a food recommendation system, a food recommendation method and a program.

BACKGROUND ART

Conventionally, food recommendation systems that suggest dishes based on the use's meal history have been proposed. For example, PTL 1 discloses a dish proposal device that suggests dishes to be eaten next by using meal patterns, preferences, food amounts and the like based on past meal histories.

CITATION LIST

Patent Literature

PTL 1

Japanese Patent Application Laid-Open No. 2022-124701

SUMMARY OF INVENTION

Technical Problem

However, since the device in PTL 1 automatically suggests dishes without confirming the user's requests, there is a risk that dishes different from what the user wanted to eat would be suggested.

An object of the present disclosure is to provide a food recommendation system that suggests appropriate dishes to the user.

Solution to Problem

A food recommendation system according to the present disclosure includes: an acquirer that acquires in advance event data including dish identification information on a dish a user has eaten, dish type information including taste sensation information that classifies the dish by taste sensation, and meal time information; an extractor that extracts a specific characteristic index corresponding to specific dish type information input from the user by calculating a characteristic index including at least one of a support level, a confidence level and a lift value related to eating habits of the user through time-series association analysis based on the event data; and a recommender that outputs a dish candidate to be suggested to the user based on the specific characteristic index.

A food recommendation method according to the present disclosure includes: acquiring in advance event data including dish identification information on a dish a user has eaten, dish type information including taste sensation information that classifies the dish by taste sensation, and meal time information: extracting a specific characteristic index corresponding to specific dish type information input from the user by calculating a characteristic index including at least one of a support level, a confidence level and a lift value related to eating habits of the user through time-series association analysis based on the event data; and outputting a dish candidate to be suggested to the user based on the specific characteristic index.

A program according to the present disclosure causes a computer to execute: acquiring in advance event data including dish identification information on a dish a user has eaten, dish type information including taste sensation information that classifies the dish by taste sensation, and meal time information: extracting a specific characteristic index corresponding to specific dish type information input from the user by calculating a characteristic index including at least one of a support level, a confidence level and a lift value related to eating habits of the user through time-series association analysis based on the event data; and outputting a dish candidate to be suggested to the user based on the specific characteristic index.

Advantageous Effects of Invention

According to the present disclosure, appropriate dishes can be suggested to the user.

BRIEF DESCRIPTION OF DRAWINGS

FIG. 5 is a diagram illustrating dish type information determined on the basis of ingredient information;

FIG. 6 is a diagram illustrating event data;

FIG. 7 is a diagram illustrating analysis data obtained through time-series association analysis on event data of the user;

FIG. 8 is a diagram illustrating analysis data extracted on the basis of specific dish type information.

FIG. 10 is a diagram illustrating comparison data obtained by comparing characteristic indices of the user and another user;

DESCRIPTION OF EMBODIMENTS

Embodiments of the present disclosure are described below with reference to the drawings.

Figure 1:
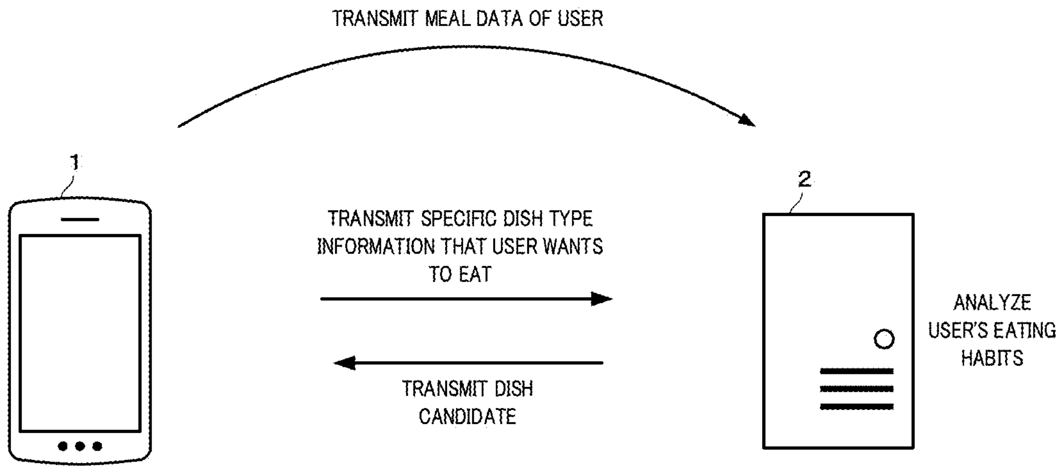
FIG. 1 is a diagram illustrating an overview of an embodiment of the present disclosure.

An overview of the present disclosure is described below. For example, as illustrated in FIG. 1, when user's meal data (e.g. images of foods, etc.) is input, user terminal 1 sequentially transmits the meal data to server 2. Here, server 2 includes the food recommendation system of the present disclosure. When receiving the meal data from terminal 1, the food recommendation system of server 2 acquires event data including identification information (e.g. name, etc.) of the dish the user has eaten, dish type information (e.g. refreshing, etc.) and meal time information (e.g. date, etc.) on the basis of the meal data, and analyzes the characteristics of the user's eating habits on the basis of the event data. At this time, when the user's eating habits are analyzed on the basis of only the dish identification information and the meal time information, the eating habits of the dish itself are analyzed, and as such it is difficult to analyze the eating habits on the basis of the dish type such as "I want something lumpy every three days", for example. In view of this, when specific dish type information that the user wants to eat (e.g. refreshing, etc.) is input to terminal 1, terminal 1 transmits the specific dish type information to server 2. When receiving the specific dish type information from terminal 1, the food recommendation system of server 2 analyzes the characteristics of the user's eating habits on the basis of the event data including the dish type information, and extracts a characteristic index of eating habits corresponding to the specific dish type information received from terminal 1. Then, the food recommendation system outputs the dish candidate to be suggested to the user on the basis of the extracted characteristic index, and transmits the dish candidate to terminal 1. In this manner, terminal 1 displays on the display the dish candidate corresponding to the specific dish type information.

Figure 2:
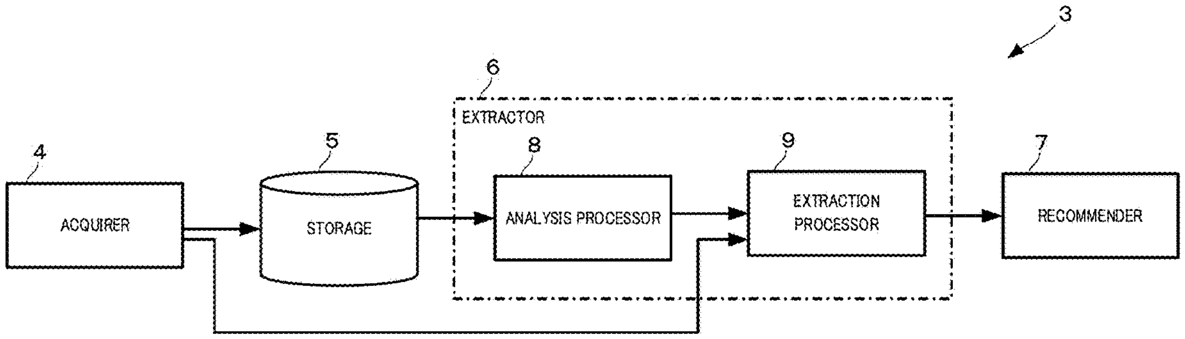
FIG. 2 is a block diagram illustrating a functional configuration of a food recommendation system according to an embodiment of the present disclosure.

Next, a configuration of the food recommendation system according to the present disclosure is elaborated. As illustrated in FIG. 2, food recommendation system 3 includes acquirer 4, storage 5, extractor 6, and recommender 7. Acquirer 4 is connected to storage 5, and storage 5 is connected to recommender 7 through extractor 6.

Acquirer 4 acquires event data including the identification information on the dish the user has eaten, the dish type information, and the meal time information. Here, the dish may include a single dish (e.g. hamburg steak, etc.), a menu showing a plurality of dishes (e.g. rice and hamburg steak, etc.) and the like. In addition, examples of the dish identification information include the name of the dish, identification number and the like. In addition, the dish type information is information for classifying dishes by the type, and may include the taste sensation information that classifies the dishes by the taste sensation, for example. Examples of the taste sensation information include texture information indicating the physical taste sensation, taste information indicating chemical taste sensation and the like. More specifically, the taste sensation information may include onomatopoeia information representing the taste sensation, more specifically information representing mimetic words or sound-mimetic words. Examples of the onomatopoeia include light, rich, plump, lumpy, dusty, crunchy, syrupy and the like. Here, the onomatopoeia information may be composed of at least a part of the character string making up the onomatopoeia. In addition, the meal time information is information related to the meal time, such as meal time, date, time period (e.g. breakfast, lunch, and dinner) and the like.

For example, acquirer 4 may receive the meal data input by the user from terminal 1. Here, the meal data is data related to the dish the user has eaten, and may include images of foods (photograph, etc.), menu, questionnaire about dishes (e.g., preference information on dishes, avoided ingredient information, the user attribute information, etc.), dish type information and the like, for example. The preference information on dishes is information related to dishes that the user prefers, and may include dish name or ingredient name that the user prefers and the like, for example. In addition, the avoided ingredient information is information related to the ingredient avoided by the user for the dishes, and may be ingredients that users dislike or have allergic reactions to and the like, for example. In addition, the user attribute information may include gender, whether or not the user is on a diet, and whether or not the user has a pre-existing medical condition (e.g., high blood pressure). When receiving the meal data, acquirer 4 creates event data in which the identification information on the dish the user has eaten, the dish type information, and the meal time information are associated with each other on the basis of the meal data.

Storage 5 stores the event data acquired by acquirer 4. Specifically, storage 5 stores the event data in which the identification information on the dish the user has eaten, the dish type information, and the meal time information are associated with each other.

Extractor 6 includes analysis processor 8, and extraction processor 9. Analysis processor 8 is connected to extraction processor 9. In addition, storage 5 is connected to analysis processor 8, and extraction processor 9 is connected to recommender 7. In addition, acquirer 4 is connected to extraction processor 9.

Analysis processor 8 analyzes the characteristics of the user's eating habits through time-series association analysis on the basis of the event data stored in storage 5. Here, the characteristics of the eating habits represent tendency (e.g. rule or condition, etc.) of selection of dishes by the user in multiple dishes, and may represent tendency of selection of a "rich and thick" dish after a "refreshing" dish in three meals, for example. For example, analysis processor 8 calculates the characteristic index including at least one of the support level, the confidence level and the lift value related to the user's eating habits.

Extraction processor 9 extracts a characteristic index of the eating habits corresponding to the specific dish type information input from the user on the basis of the characteristics of the user's eating habits analyzed by analysis processor 8. For example, when acquirer 4 acquires from terminal 1 the specific dish type information input to terminal 1 by the user, acquirer 4 may output the specific dish type information to extraction processor 9. For example, when the specific taste sensation information "refreshing" is input as the specific dish type information from the user, extraction processor 9 may calculate a characteristic index representing the eating habits corresponding to the "refreshing", for example.

Recommender 7 outputs the dish candidate to be suggested to the user on the basis of the characteristic index acquired at extraction processor 9. At this time, recommender 7 may output the dish candidate on the basis of the event data that satisfies at least one condition of a support level equal to or greater than the predetermined threshold value, a confidence level equal to or greater than the predetermined threshold value, and a lift value equal to or greater than the predetermined threshold value. In addition, recommender 7 may analyze the characteristics of the other user's eating habits on the basis of the event data including the identification information of the food the other user has eaten, the dish type information, and the meal time information. Then, recommender 7 may search for the dish candidate to be suggested to the user on the basis of the characteristic index of another user and the characteristic index of the user calculated by extraction processor 9.

Figure 3:
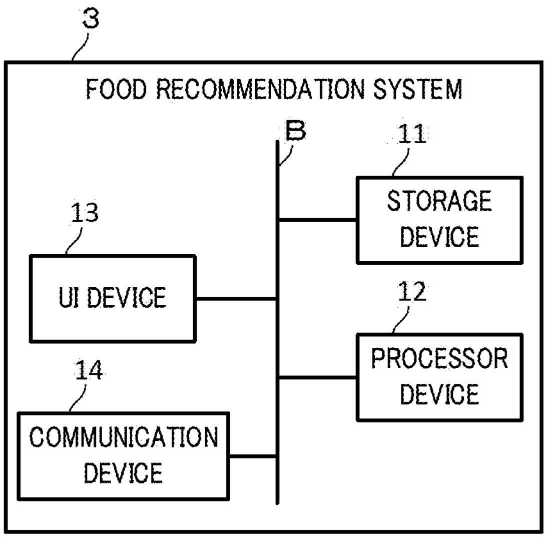
FIG. 3 is a block diagram illustrating a hardware configuration of a food recommendation system according to an embodiment of the present disclosure.

FIG. 3 illustrates a hardware configuration of food recommendation system 3.

Food recommendation system 3 includes storage device 11, processor device 12, user interface (UI) device 13, and communication device 14, which are connected to each other through bus B.

Note that, the programs or instructions for implementing various functions and processes described later in food recommendation system 3 may be downloaded from a given external device through network, or may be provided from a detachable storage medium such as a CD-ROM (Compact Disk-Read Only Memory) and a flash memory.

Storage device 11 is implemented by one or more non-transitory storage media (non-transitory storage media) such as a random access memory, a flash memory, and a hard disk drive, and stores files, data and the like used for executing programs or instructions together with installed programs or instructions, for example.

Processor device 12 may be implemented by one or more GPUs (Graphics Processing Units), processing circuits (processing circuitry) and CPUs (Central Processing Unit) that may be composed of one or more processor device cores. Processor device 12 executes various functions and processes of food recommendation system 3 described later in accordance with the data such as programs, instructions, parameters required for executing the programs or instructions stored in storage device 11.

UI device 13 may be composed of input devices such as keyboard, mouse, camera, and microphone, output devices such as display, speaker, headset, and printer, or input/output devices such as smart phone, tablet, and touch panel, and implements the interface between the administrator and the food recommendation system 3. For example, the administrator may operate the food recommendation system 3 by manipulating the graphical user interface (GUI) displayed on the display or touch panel using a keyboard, mouse, and the like.

Note that, the above-described hardware configuration is merely an example, and food recommendation system 3 according to the present disclosure may be implemented by other appropriate hardware configurations.

Figure 4:
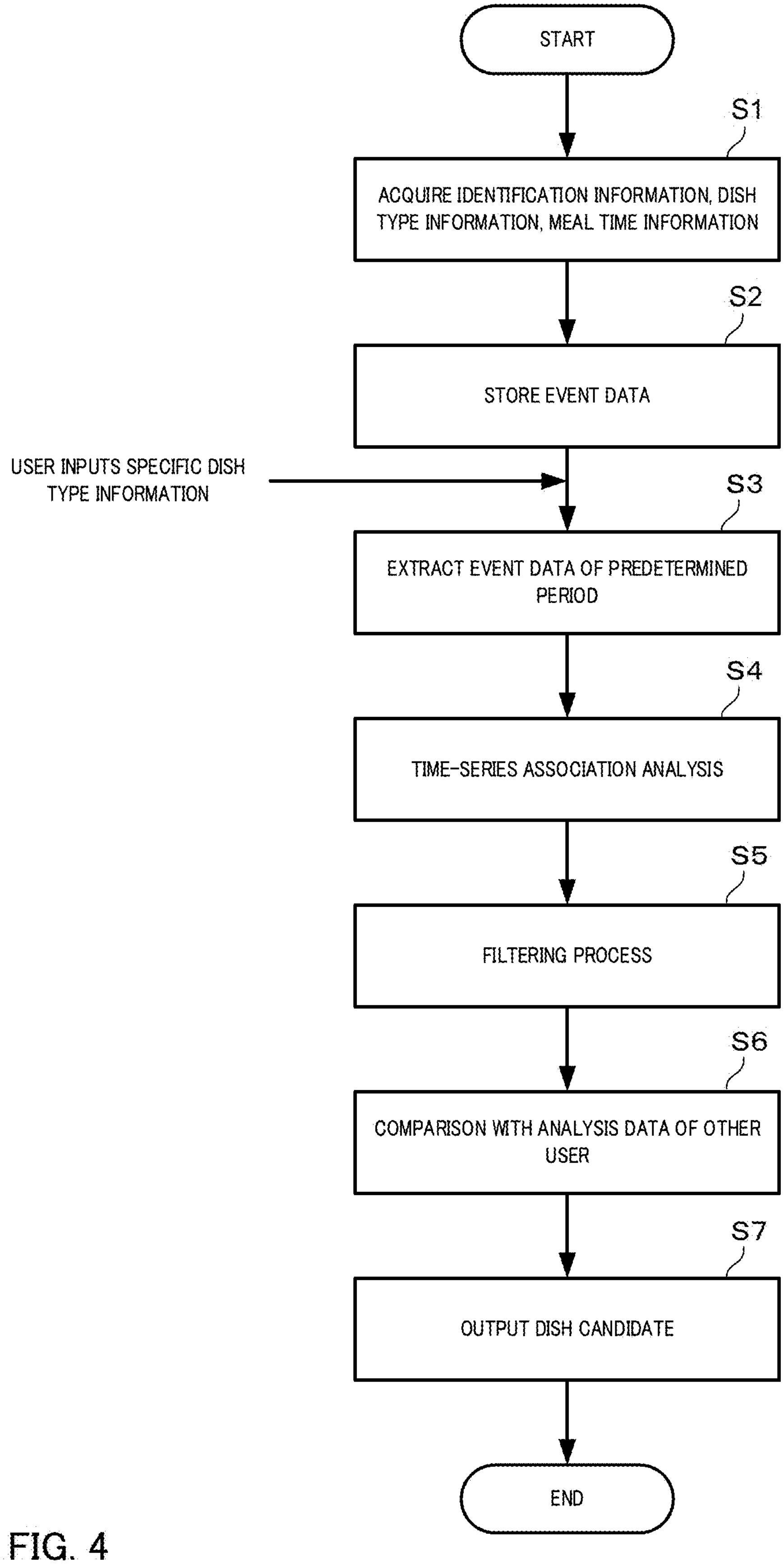
FIG. 4 is a flowchart illustrating an operation of an embodiment of the present disclosure.

Next, an operation of the present embodiment is described with reference to the flowchart illustrated in FIG. 4.

First, at step S1, acquirer 4 of food recommendation system 3 illustrated in FIG. 2 acquires event data including the identification information on the dish the user has eaten, the dish type information, and the meal time information. For example, acquirer 4 may acquire the event data on the basis of the meal data of the user. For example, when the user inputs to terminal 1 meal data such as a captured image of a dish eaten, terminal 1 sequentially transmits the meal data to server 2. Then, when receiving the meal data of the user from terminal 1, acquirer 4 of food recommendation system 3 at server 2 acquires the identification information on the dish the user has eaten, the dish type information, and the meal time information on the basis of the meal data. At this time, acquirer 4 may further acquire the ingredient information on the dish the user has eaten on the basis of the meal data. Note that, the ingredient information is information on ingredients used in the dish, and may include information on ingredients (e.g., radish, carrots, etc.), seasonings (e.g., soy sauce, miso, etc.), and quantity of ingredients, for example.

For example, acquirer 4 may recognize the name (identification information) and the ingredient information on the dish the user has eaten on the basis of the captured image of the dish received as meal data, and estimate the taste sensation information (dish type information) that classifies the dishes by the taste sensation on the basis of the ingredient information. For example, as illustrated in FIG. 5, even when the same dishes as chicken stew 1 to chicken stew 5 are recognized, acquirer 4 may recognize differences in the ingredient information on chicken stews 1 to 5, and estimate taste sensation information on the basis of the ingredient information. For example, when acquirer 4 recognizes that the ingredient information on chicken stew 1 is Japanese yam on the basis of a captured image of chicken stew 1, acquirer 4 may estimate that the taste sensation information is "soft and chewy" on the basis of the texture of the Japanese yam. Note that, the ingredient information of chicken stew 4 and chicken stew 5 is indicated as "radish", but it may be classified as "refreshing" and "syrupy" on the basis of other ingredients. Specifically, the taste sensation information may be comprehensively estimated from information on a plurality of ingredients used in the dish. In addition, acquirer 4 may acquire the meal time information on the basis of the capturing time associated with the meal data received from terminal 1, for example.

Note that, in the above-mentioned embodiment, acquirer 4 acquires the identification information on the dish the user has eaten, the dish type information, the meal time information, and the ingredient information on the basis of the meal data of the user, but this is not limitative as long as the above-described information can be acquired. For example, acquirer 4 may directly acquire from terminal 1 the identification information on the dish the user has eaten, the dish type information, the meal time information, and the ingredient information. Specifically, terminal 1 may receive the input of the identification information on the dish the user has eaten, the dish type information, the meal time information, and the ingredient information from the user, and transmit to server 2 the dish identification information, the dish type information, the meal time information, and the ingredient information input from the user.

Subsequently, at step S2, acquirer 4 stores the acquired event data in storage 5. At this time, acquirer 4 may store in storage 5 event data in which at least one of the dish the user has eaten and the ingredient information, and the dish type information are associated with each other. For example, as illustrated in FIG. 6, acquirer 4 may store in storage 5 event data 15 in which the name (identification information), the taste sensation information (dish type information) and the ingredient information on the dish the user has eaten are associated with each other for each date of the meal time information. In this manner, acquirer 4 updates event data 15 each time the meal data of the user is received to construct event data 15 of the dish the user has eaten in the past.

On the other hand, terminal 1 may receive from the user a suggestion request of the dish that the user will now prepare. In this case, terminal 1 may receive the input of the specific dish type information. For example, terminal 1 may receive specific taste sensation information that classifies the dish by the taste sensation. In this case, terminal 1 may receive the onomatopoeia information representing the taste sensation as the taste sensation information. When the specific dish type information is input from the user, terminal 1 transmits the specific dish type information to server 2. Here, it is assumed that the user has input the onomatopoeia "refreshing" into terminal 1 as the specific taste sensation information.

In this manner, the dish type information includes the taste sensation information that classifies the dishes by the taste sensation. For example, when a dish is classified on the basis of food culture such as "French cuisine", such a dish includes various types of food (e.g. "refreshing" dishes and "rich and thick" dishes), and consequently it is difficult to appropriately indicate the dishes desired by the user. In view of this, the user can appropriately designate the desired dish range by designating the dish type by the taste sensation information. In addition, the taste sensation information includes onomatopoeia information representing the taste sensation. As such, the user can easily designate the taste sensation information.

In food recommendation system 3 of server 2, when the specific taste sensation information "refreshing" input by the user is received from terminal 1, extractor 6 analyzes the characteristics of the user's eating habits on the basis of event data 15 stored in storage 5. For example, at step S3, analysis processor 8 of extractor 6 extracts from storage 5 event data 15 of a predetermined period (e.g. 14 days). Then, at step S4, analysis processor 8 may calculate the characteristic index indicating the user's eating habits through time-series association analysis on extracted event data 15. Examples of the characteristic index include the support level, the confidence level and the lift value and the like for the combinations of events, for example. For example, analysis processor 8 may calculate the characteristic index including at least one of the support level, the confidence level and the lift value. Note that, analysis processor 8 may automatically calculate the characteristic index event data 15 stored in storage 5 without receiving the specific taste sensation information from the user.

More specifically, as illustrated in FIG. 6, when recognizing that the name of the dish, the taste sensation information and the ingredient information to be event data 15*a*, event data 15*b*, . . . for each line (e.g. per day) in event data 15 of 14 days (predetermined period), analysis processor 8 may calculate the characteristic index on the basis of a combination of two event data included in a predetermined analysis period (e.g. 3 days). For example, when April 10 is set as the reference day, analysis processor 8 sets the three days, April 10, April 9 (1 day before), and April 8 (two days before) as the analysis period, and calculates the characteristic index for the combination of the two event data included in the analysis period. For example, as illustrated in FIG. 7, analysis processor 8 calculates the characteristic index for all combinations of event data 15*z*1 corresponding to event A before the reference day (the event of April 9 or April 8), and event data 15*z*2 corresponding to event B of the reference day (the event of April 10). Subsequently, when the reference day is shifted by one and set to April 9, analysis processor 8 sets the three days, April 9, April 8 (1 day before) and April 7 (two days before), to the next analysis period, and calculates each characteristic index on the basis of all combinations of two pieces of event data 15*z*1 and 15*z*2 included in the analysis period in the same manner. In this manner, analysis processor 8 calculates the characteristic index on the basis of the combination of two pieces of event data 15*z*1 and 15*z*2 included in each analysis period while sequentially shifting the analysis period within 14 days (predetermined period). Then, analysis processor 8 generates analysis data 16 of 14 days (predetermined period) including event data 15*z*1 of event A, event data 15*z*2 of event B, and the characteristic index.

Here, the support level may represent the number of combinations of event data 15*z*1 of event A and event data 15*z*2 of event B, and may be calculated by the following Equation (1), for example. In addition, the confidence level may represent the probability of eating the dish of event A one day or two days before eating the dish of event B, and may be calculated by the following Equation (2), for example. In addition, the lift value may represent the degree of increase in the probability of eating the dish of event A one day or two days before eating the dish of event B, and may be calculated on the basis of the following Equation (3), for example. Note that, the total number of data may be calculated by the number of pieces of dish identification information×the number of pieces of dish type information× the number of pieces of ingredient information×the number of analysis periods (e.g. 3), for example.

$$\text{Support level} = \text{the number of data in which event data } 15z1 \text{ of event } A \text{ and event data } 15z2 \text{ of event } B \text{ indicate the same combination} \div \text{the total number of data} \tag{1}$$

$$\text{Confidence level} = \text{the number of data in which event data } 15z1 \text{ of event } A \text{ and event data } 15z2 \text{ of event } B \text{ indicate the same combination} \div \text{the number of data including event data } 15z2 \text{ of event B} \tag{2}$$

$$\text{Life value} = \text{the number of data in which event data } 15z1 \text{ of event } A \text{ and event data } 15z2 \text{ of event } B \text{ indicate the same combination} \div \text{the number of data including event data } 15z2 \text{ of event B} \div \text{the number of data including event data } 15z1 \text{ of event } A \div \text{the total number of data} \tag{3}$$

At this time, analysis processor 8 may search for analysis data 16 on the basis of the temporal order of event data 15*a*, 15*b*, . . . in event data 15, and filter and remove the data of the order that is not included in event data 15. For example, in the case where event data 15*z*2 (corresponding to event B) is recorded on the next day of event data 15*z*1 (corresponding to event A) in event data 15, analysis processor 8 may filter and remove data with event A representing event data 15*z*2 and event B representing event data 15*z*1 (data with the reverse order of event data 15) in analysis data 16. In this manner, event data 15 is subjected to association analysis in a time-series manner.

In this manner, analysis processor 8 analyzes the characteristics of the eating habits of user P through time-series association analysis on event data 15, and outputs the characteristic index such as the support level, the confidence level and the lift value. In this manner, analysis processor 8 can correctly indicate the eating habits of user P with the characteristic index.

In addition, event data 15 includes information on the ingredient of the dish eaten by user P. In this manner, analysis processor 8 can more correctly analyze the characteristics of the eating habits of user P on the basis of the difference in ingredient information.

In addition, event data 15 is composed of at least one of the dish eaten by user P and the ingredient information and the dish type information that are associated with each other. In this manner, analysis processor 8 can easily analyze the characteristics of the eating habits of user P.

In addition, the dish type information includes the taste sensation information that classifies the dishes by the taste sensation. Analysis processor 8 performs the analysis on the basis of the taste sensation information that has a significant influence on the user's eating habits, and therefore can correctly analyze the characteristics of the eating habits of user P. In addition, the taste sensation information includes onomatopoeia information representing the taste sensation. Analysis processor 8 performs analysis on the basis of the onomatopoeia accurately representing the taste sensation information, and therefore can more correctly analyze the characteristics of the eating habits of user P.

Subsequently, analysis processor 8 outputs generated analysis data 16 to extraction processor 9. Note that, in the above-mentioned embodiment, analysis processor 8 performs time-series association analysis on event data 15 after the specific dish type information input by user P is received from terminal 1, but this is not limitative as long as time-series association analysis can be performed. For example, analysis processor 8 may store in advance analysis data 16 obtained through time-series association analysis on event data 15 in the storage. Then, when the specific dish type information input by user P is received from terminal 1, analysis processor 8 may output analysis data 16 stored in the storage to extraction processor 9.

Extraction processor 9 receives analysis data 16 from extraction processor 9. In addition, extraction processor 9 receives from acquirer 4 the specific taste sensation information "refreshing" input to terminal 1 by user P. Then, at step S5, extraction processor 9 performs filtering of analysis data 16 on the basis of the specific taste sensation information "refreshing".

For example, extraction processor 9 may extract analysis data 16*a* in which the dish type information of event B represents specific taste sensation information 29 "refreshing" from analysis data 16 as illustrated in FIG. 8. Note that the variable name is a name representing a combination of event data 15*z*1 of event A and event data 15*z*2 of event B. Here, variable names X, Y and Z represent the same combinations of event data 15*z*1 of event A and event data 15*z*2 of event B with respective support levels (X1, X2 . . . ), confidence levels (Y1, . . . ) and lift values (Z1, . . . ). In addition, the variable value is a value obtained by normalizing the support level, the confidence level and the lift value of the characteristic index.

In this manner, extraction processor 9 extracts characteristic index 17 representing the eating habits corresponding to specific taste sensation information 29 input from the user on the basis of analysis data 16 representing the characteristics of the user's eating habits.

Note that, extraction processor 9 may extract characteristic index 17 by further using at least one of the preference information and the avoided ingredient information of user P. For example, extraction processor 9 may search for analysis data 16*a* on the basis of the preference information of user P, and preferentially extract event data including characteristic index 17 in which the dish or ingredient corresponding to the preference information is registered. In addition, extraction processor 9 may search for analysis data 16*a* on the basis of avoided ingredient information of user P, and extract event data including characteristic index 17 in which the avoided ingredient information is not registered. Specifically, extraction processor 9 may delete the event data in which the avoided ingredient information is registered from analysis data 16*a*. Note that, the preference information and the avoided ingredient information may be calculated on the basis of the meal data of user P, or may be set by user P. In this manner, extraction processor 9 can appropriately extract characteristic index 17 in accordance with the preference information or the avoided ingredient information of user P.

In addition, extraction processor 9 may extract characteristic index 17 by further using the attribute information of user P. For example, when the attribute information of user P is set as being on a diet, extraction processor 9 may extract event data of dishes with calories equal to or smaller than a predetermined value. Note that the attribute information may be set by user P.

In addition, extraction processor 9 may extract characteristic index 17 by further using recipe viewing history. For example, when user P searches the Web for a recipe for a dish, terminal 1 may transmit its recipe viewing information to server 2. Extraction processor 9 may calculate the preference information of user P on the basis of the recipe viewing history sent from terminal 1. Then, extraction processor 9 may preferentially extract event data including characteristic index 17 in which the dish or ingredient corresponding to the calculated preference information of user P is registered.

Subsequently, extraction processor 9 outputs analysis data 16 including the extracted characteristic index 17 to recommender 7. When analysis data 16*a* is input, recommender 7 compares analysis data obtained through time-series association analysis on the characteristics of the other user's eating habits, with analysis data 16*a* of the user at step S6. Here, on the basis of the event data including the identification information of the food the other user has eaten, the dish type information, and the meal time information, recommender 7 may store in advance analysis data obtained by analyzing the characteristics of the other user's eating habits as with the user in the storage.

Figure 9:
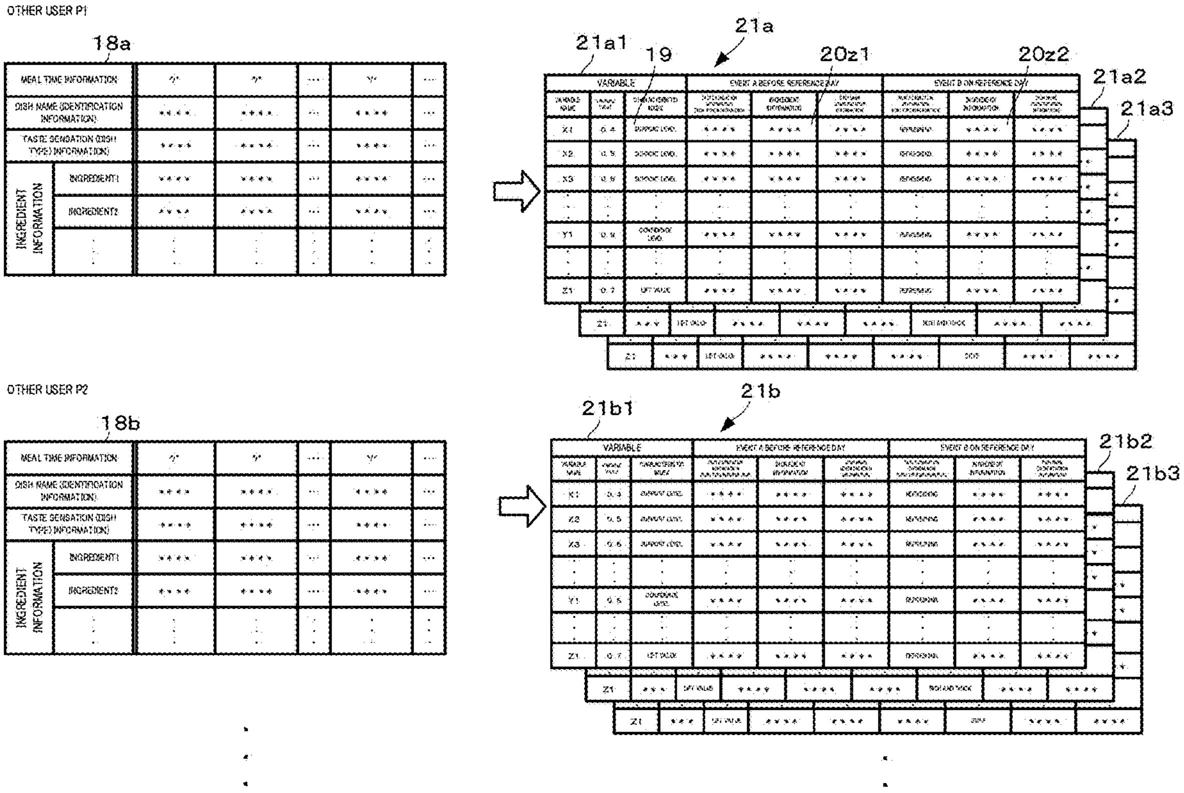
FIG. 9 is a diagram illustrating a state where time-series association analysis is performed on event data of another user.

For example, as illustrated in FIG. 9, recommender 7 acquires in advance event data 18*a*, 18*b*, . . . of a plurality of other users P1, P2, . . . , and analyzes the characteristics of the other user's eating habits on the basis of event data 18*a*, 18*b* . . . . At this time, recommender 7 may calculate characteristic index 19 indicating the other user's eating habits through time-series association analysis on event data 18*a*, 18*b* . . . . Then, recommender 7 may generate analysis data 21*a*, 21*b* . . . including event data 20*z*1 of event A, event data 20*z*2 of event B, and characteristic index 19.

Note that, when variable names do not coincide with each other between other users P1, P2, . . . (when a variable name of a specific user is missing), recommender 7 may complement the missed variable name of the specific user on the basis of the average value of the variable value and the like of other users P1, P2, . . . having a variable name. In addition, recommender 7 may acquire from extraction processor 9 the preference information, the avoided ingredient information, the attribute information, or the recipe viewing history of user P, and extract characteristic index 19 by using the above-described information as with extraction processor 9. For example, between step S6 and step S7, recommender 7 may perform filtering of analysis data 21*a*, 21*b* . . . on the basis of the preference information, the avoided ingredient information, the attribute information, or the recipe viewing history of user P.

Here, analysis data 21*a* may be generated for each type of the dish type information of event B. For example, analysis data 21*a* of other user P1 may be generated for each type of the taste sensation information such as analysis data 21*al* with the taste sensation information of event B representing "refreshing", analysis data 21*a*2 with the taste sensation information of event B representing "plump and juicy", and analysis data 21*a*3 with the taste sensation information of event B representing "stiff". Recommender 7 stores analysis data 21*a*, 21*b* . . . of other users P1, P2, . . . in advance in the storage.

Subsequently, when analysis data 16*a* of the user representing the taste sensation information "refreshing" of event B is input from extraction processor 9, recommender 7 extracts analysis data 21*a*1, 21*b*1, . . . corresponding to the taste sensation information "refreshing" from among analysis data 21*a*, 21*b* . . . of other users P1, P2, . . . stored in the storage, for example. Then, recommender 7 compares analysis data 21*a*1, 21*b*1, . . . corresponding to the taste sensation information "refreshing", with analysis data 16*a* of the user.

At this time, recommender 7 may search for the dish candidate to be suggested to the user from analysis data 21*a*1, 21*b*1, . . . including the eating habits corresponding to the taste sensation information "refreshing" of the other user on the basis of the characteristic index representing the eating habits corresponding to the specific taste sensation information "refreshing" input from the user. For example, as illustrated in FIG. 10, recommender 7 may search for the dish candidate to be suggested to user P by comparing variable value 23 of user P (characteristic index) and variable value 24 of other users P1, P2, . . . (characteristic index) with comparison data 22 by utilizing collaborative filtering. At this time, recommender 7 may calculate the similarity of variable value 24 of other users P1, P2, . . . to variable value 23 of user P for all variables X1, X2, . . . , Y1, . . . , Z1, . . . . As an example, recommender 7 may calculate the cosine similarity on the basis of the vector of variable value 23 of user P and the vector of variable value 24 of other users P1, P2, . . . . Then, recommender 7 selects the other user with a similarity equal to or greater than a predetermined value, for example other users P1 and P2 with a similarity equal to or greater than 0.8, as a user with a high similarity in eating habits to user P. Subsequently, recommender 7 counts for each variable the number of variable values 24*a* that indicate a value within a predetermined value (e.g. matching value) with respect to variable value 23 of user P from among variable values 24 of other users P1 and P2 with similar eating habits. Then, recommender 7 selects variables X2, Y1 and Z1 with a large number of variable values 24*a*, and outputs the dish candidate on the basis of the selected variables X2, Y1 and Z1 at step S7. At this time, recommender 7 may preferentially select the variable including event A that coincides with the name or taste sensation information of the dish eaten by user P one or two days before from among the selected variables X2, Y1 and Z1.

Note that, the method of recommender 7 for searching for the dish candidate to be suggested to the user is not limited to the collaborative filtering. For example, it is possible to search for the dish candidate to be suggested to the user by using statistics analysis, machine learning, deep learning or the like from analysis data 21*a*1, 21*b*1, . . . including the eating habits corresponding to the taste sensation information "refreshing" of the other user on the basis of the characteristic index representing the eating habits corresponding to the specific taste sensation information "refreshing" input from the user.

Figure 11:
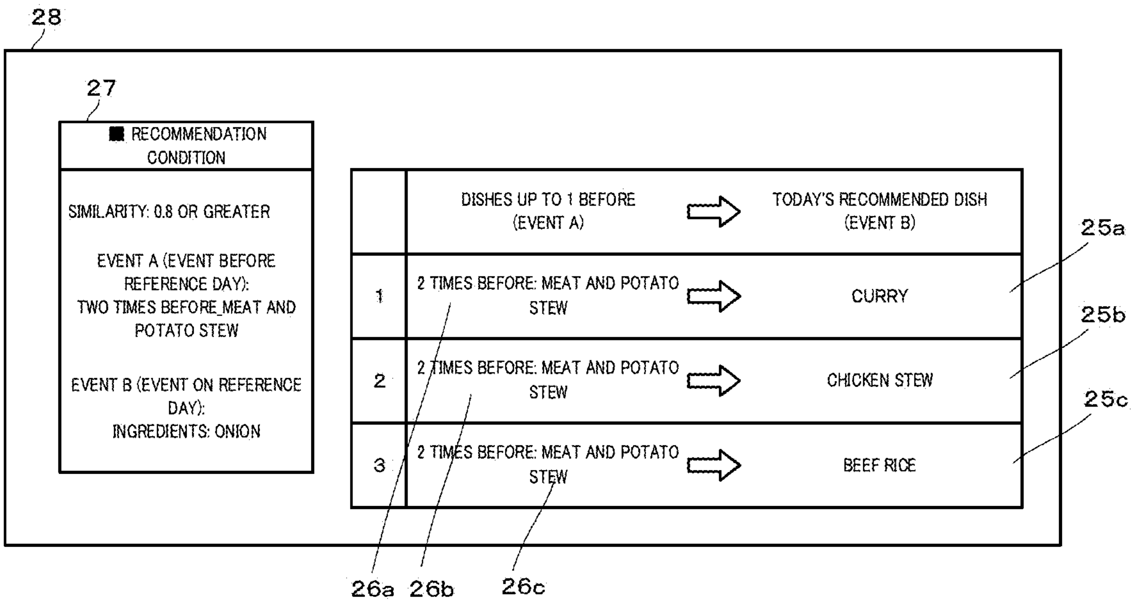
FIG. 11 is a diagram illustrating suggestion data including dish candidates output from a recommender.

For example, as illustrated in FIG. 11, when the dishes of event B of variables X2, Y1 and Z1 are "curry", "chicken stew" and "gyudon", recommender 7 may output the dishes as dish candidates 25*a* to 25*c*. In addition, recommender 7 may output the dish of event A of variables X2, Y1 and Z1 "meat and potato stew" as reference dishes 26*a* to 26*c*. At this time, in the case where the dish eaten by user P 1 day before is "meat and potato stew", recommender 7 may preferentially select variables X2, Y1 and Z1 in which the dish of event A is recorded as "meat and potato stew". In addition, recommender 7 may output condition-related information 27 related to the condition of the selection of variables X2, Y1 and Z1. In this manner, suggestion data 28 including dish candidates 25*a* to 25*c*, reference dishes 26*a* to 26*c*, and condition-related information 27 is created.

In this manner, recommender 7 outputs dish candidates 25*a* to 25*c* to be suggested to user P on the basis of characteristic index 17 such as the support level, the confidence level and the lift value. Here, characteristic index 17 is an index obtained by analyzing the characteristics of the eating habits of user P on the basis of event data 15 including the dish identification information and the dish type information and meal time information of user P, and performing extraction in accordance with the specific dish type information input from user P on the basis of the characteristics of the eating habits of user P at extractor 6. In this manner, recommender 7 can suggest appropriate dishes to user P.

In addition, recommender 7 analyzes the characteristics of the eating habits of other users P1, P2, . . . , and searches for dish candidates 25*a* to 25*c* on the basis of characteristic index 17 of user P and characteristic index 19 of other users P1, P2, . . . . In this manner, recommender 7 outputs dish candidates 25*a* to 25*c* on the basis of the eating habits of other users P1, P2, . . . . In this manner, recommender 7 can output various dish candidates 25*a* to 25*c* other than meal history of user P, and can reduce repetitive suggestion of dishes previously eaten by user P.

Figure 12:
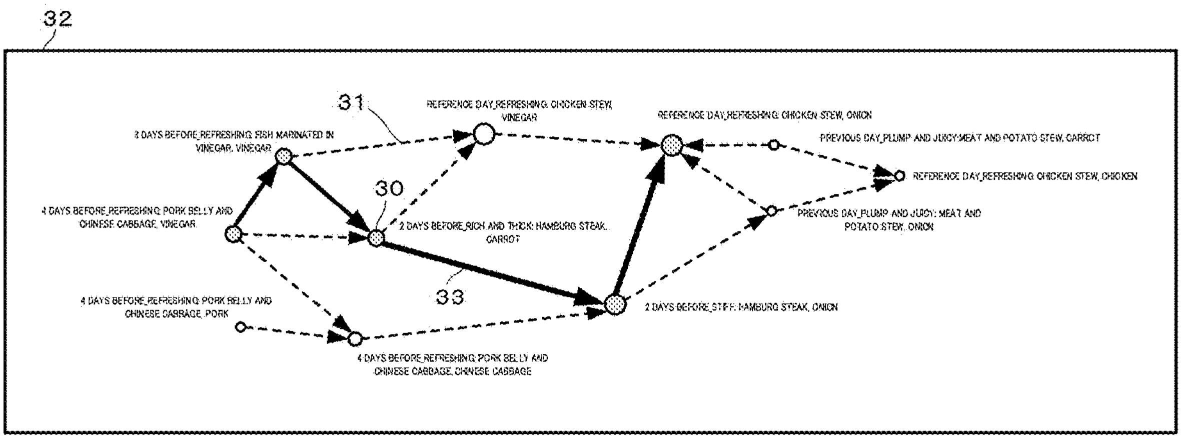
FIG. 12 is a diagram illustrating eating habit data output from the recommender.

Here, recommender 7 may output information other than dish candidates 25*a* to 25*c*. For example, recommender 7 may output eating habit data representing the time relationship between event data including 15*z*1 and event data 15*z*2 including the dish identification information and the dish type information on the basis of analysis data 16*a* of user P output from extraction processor 9. In addition, recommender 7 may output eating habit data representing the time relationship between event data including 20*z*1 and event data 20*z*2 including the dish identification information and the dish type information on the basis of analysis data 21*al* and 21*b*1 of other users P1 and P2. For example, as illustrated in FIG. 12, recommender 7 may output eating habit data 32 that indicates as node 30 and edge 31 the time relationship between event data including 15*z*1 and event data 15*z*2 including the taste sensation information (dish type information), the name of the dish (identification information), and the ingredient information on the basis of analysis data 16*a* of user P. Here, for example, node 30 may be formed such that the higher the support level or the frequency of selection of event data 15*z*2 of event B, the larger the size. In addition, edge 31 may be formed such that the greater the lift value or the confidence level, the greater the thickness. At this time, recommender 7 may create eating habit data 32 only for a predetermined number of edges 31 with highest lift values or confidence levels (e.g. only for the top 26 edges 31). Then, recommender 7 may select path 33 sequentially connected in order of the thickness of node 30 on a time-series basis for a predetermined period (e.g. four days), and indicate path 33 by changing the display form.

In this manner, recommender 7 outputs eating habit data 32 representing the time relationship between event data 15*z*1 and 15*z*2 on the basis of characteristic index 17 representing the characteristics of the eating habits of user P. In this manner, unconscious eating habits of user P are visualized, and thus user P can easily understand the intention of suggestion of dish candidates 25*a* to 25*c* in the suggestion data 28.

Subsequently, recommender 7 transmits the created suggestion data 28 to terminal 1. At this time, recommender 7 may transmit eating habit data 32 to terminal 1. When receiving suggestion data 28 and eating habit data 32, terminal 1 displays suggestion data 28 and eating habit data 32 on the display.

According to the present embodiment, extractor 6 acquires in advance event data 15 including the dish identification information and the dish type information and meal time information of user P, analyzes the characteristics of the eating habits of user P on the basis of event data 15, and extracts characteristic index 17 of the eating habits corresponding to the specific dish type information input from user P on the basis of the characteristics of the eating habits of user P. Then, recommender 7 outputs dish candidates 25*a* to 25*c* to be suggested to user P on the basis of characteristic index 17. In this manner, recommender 7 can suggest appropriate dishes to user P.

Note that, in the present embodiment, recommender 7 outputs dish candidates 25*a* to 25*c* on the basis of the eating habits of other users P1, P2, . . . , but this is not limitative as long as dish candidates 25*a* to 25*c* can be output. For example, recommender 7 may select dish candidates 25*a* to 25*c* from analysis data 16*a* representing the eating habits of user P on the basis of characteristic index 17. For example, recommender 7 may select dish candidates 25*a* to 25*c* in descending order of the value of characteristic index 17 in analysis data 16*a*.

In addition, in the present embodiment, food recommendation system 3 is disposed in server 2, but this is not limitative as long as the dish candidate can be output. For example, food recommendation system 3 may be disposed in terminal 1.

In addition, while the present embodiment uses dish names or ingredient names of Japanese food for the sake of description of the present disclosure, this is not limitative. For example, the dish names or ingredient names may be changed in accordance with the food culture of the country where the food recommendation system, the food recommendation method and the program are used.

The specific examples of the present disclosure have been described in detail above, but these are examples only and do not limit the scope of the claims. The technology described in the claims includes various variations and modifications of the specific examples illustrated above.

This application is entitled to and claims the benefit of Japanese Patent Application No. 2023-051611 filed on Mar. 28, 2023, the disclosure each of which including the specification, drawings and abstract is incorporated herein by reference in its entirety.

INDUSTRIAL APPLICABILITY

The food recommendation system according to the present disclosure is applicable to systems that suggest dish candidates to the user.

REFERENCE SYMBOLS LIST

1 Terminal
2 Server
3 Food recommendation system
4 Acquirer
5 Storage
6 Extractor
7 Recommender
8 Analysis processor
9 Extraction processor
11 Storage device
12 Processor device
13 UI device
14 Communication device
15 Event data
16, 16*a* Analysis data
17 Characteristic index
18*a*, 18*b* Event data
21*a*, 21*b* Analysis data
22 Comparison data
23 Variable value
24 Variable value
25*a* to 25*c* Dish candidate
26*a* to 26*c* Reference dish
27 Condition-related information
28 Suggestion data
29 Specific taste sensation information
30 Node
31 Edge
32 Eating habit data
33 Path
P User
P1, P2 Other user

The invention claimed is:

1. A food recommendation system comprising:

a communication device configured to communicate with a terminal;

a storage device configured to store event data and analysis data; and a processor coupled to the storage device and the communication device and configured to perform operations comprising:

acquiring in advance event data including dish identification information on a dish a user has eaten, dish type information including taste sensation information that classifies the dish by taste sensation, and meal time information, based on meal data received from the terminal via the communication device, and storing the event data in the storage device;

extracting a specific characteristic index corresponding to specific dish type information input from the user by calculating a characteristic index including at least one of a support level, a confidence level and a lift value related to eating habits of the user through time-series association analysis based on the event data; and extracting, from the storage device, event data of a predetermined period and, for each of a plurality of analysis periods sequentially shifted within the predetermined period, calculating the characteristic index based on a combination of event data corresponding to an event A before a reference day and event data corresponding to an event B on the reference day, and generating analysis data including the event data corresponding to event A, the event data corresponding to event B, and the characteristic index, wherein the support level is a number of data in which the event data corresponding to event A and the event data corresponding to event B indicate the same combination divided by a total number of data, the confidence level is the number of data in which the event data corresponding to event A and the event data corresponding to event B indicate the same combination divided by a number of data including the event data corresponding to event B, the lift value is the number of data in which the event data corresponding to event A and the event data corresponding to event B indicate the same combination divided by the number of data including the event data corresponding to event B, divided by a number of data including the event data corresponding to event A, and divided by the total number of data, and the operations further comprise outputting a dish candidate to be suggested to the user based on the specific characteristic index as suggestion data to the terminal via the communication device.

2. The food recommendation system according to claim 1, wherein the taste sensation information includes onomatopoeia information representing the taste sensation.

3. The food recommendation system according to claim 1, wherein the event data includes ingredient information on the dish the user has eaten.

4. The food recommendation system according to claim 3, wherein the event data includes at least one of the dish identification information and the ingredient information, and the dish type information that are associated with each other.

5. The food recommendation system according to claim 1, wherein the operations further comprise extracting the specific characteristic index by further using at least one of avoided ingredient information and preference information of the user.

6. The food recommendation system according to claim 1, wherein the operations further comprise analyzing characteristics of eating habits of another user, and searching for the dish candidate based on the specific characteristic index of the user and a characteristic index of the another user.

7. The food recommendation system according to claim 1, wherein the operations further comprise outputting eating habit data that represents a time relationship of the event data by using a node and an edge based on the specific characteristic index.

8. A food recommendation method performed by a processor coupled to a storage device and a communication device, comprising:

receiving meal data from a terminal via the communication device;

acquiring in advance event data including dish identification information on a dish a user has eaten, dish type information including taste sensation information that classifies the dish by taste sensation, and meal time information based on the meal data, and storing the event data in the storage device;

extracting a specific characteristic index corresponding to specific dish type information input from the user by calculating a characteristic index including at least one of a support level, a confidence level and a lift value related to eating habits of the user through time-series association analysis based on the event data; and extracting, from the storage device, event data of a predetermined period and, for each of a plurality of analysis periods sequentially shifted within the predetermined period, calculating the characteristic index based on a combination of event data corresponding to an event A before a reference day and event data corresponding to an event B on the reference day, and generating analysis data including the event data corresponding to event A, the event data corresponding to event B, and the characteristic index, wherein the support level is a number of data in which the event data corresponding to event A and the event data corresponding to event B indicate the same combination divided by a total number of data, the confidence level is the number of data in which the event data corresponding to event A and the event data corresponding to event B indicate the same combination divided by a number of data including the event data corresponding to event B, the lift value is the number of data in which the event data corresponding to event A and the event data corresponding to event B indicate the same combination divided by the number of data including the event data corresponding to event B, divided by a number of data including the event data corresponding to event A, and divided by the total number of data, and the method further comprises outputting a dish candidate to be suggested to the user based on the specific characteristic index as suggestion data to the terminal via the communication device.

9. A non-transitory computer-readable medium storing instructions that, when executed by a computer comprising a communication device, a storage device and a processor connected to the communication device and the storage device, cause the computer to execute:

receiving meal data from a terminal via the communication device;

acquiring in advance event data including dish identification information on a dish a user has eaten, dish type information including taste sensation information that classifies the dish by taste sensation, and meal time information based on the meal data, and storing the event data in the storage device;

extracting a specific characteristic index corresponding to specific dish type information input from the user by calculating a characteristic index including at least one of a support level, a confidence level and a lift value related to eating habits of the user through time-series association analysis based on the event data; and extracting, from the storage device, event data of a predetermined period and, for each of a plurality of analysis periods sequentially shifted within the predetermined period, calculating the characteristic index based on a combination of event data corresponding to an event A before a reference day and event data corresponding to an event B on the reference day, and generating analysis data including the event data corresponding to event A, the event data corresponding to event B, and the characteristic index, wherein the support level is a number of data in which the event data corresponding to event A and the event data corresponding to event B indicate the same combination divided by a total number of data, the confidence level is the number of data in which the event data corresponding to event A and the event data corresponding to event B indicate the same combination divided by a number of data including the event data corresponding to event B, the lift value is the number of data in which the event data corresponding to event A and the event data corresponding to event B indicate the same combination divided by the number of data including the event data corresponding to event B, divided by a number of data including the event data corresponding to event A, and divided by the total number of data, and the instructions further cause the computer to execute outputting a dish candidate to be suggested to the user based on the specific characteristic index as suggestion data to the terminal via the communication device.

* * * * *